US012164031B2

(12) United States Patent
Sachdev et al.

(10) Patent No.: US 12,164,031 B2
(45) Date of Patent: Dec. 10, 2024

(54) METHOD AND SYSTEM FOR A THRESHOLD NOISE FILTER

(71) Applicant: Waymo LLC, Mountain View, CA (US)

(72) Inventors: Kanika Sachdev, Sunnyvale, CA (US); Pierre-Yves Droz, Los Altos, CA (US); Caner Onal, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 803 days.

(21) Appl. No.: 17/246,187

(22) Filed: Apr. 30, 2021

(65) Prior Publication Data

US 2022/0350025 A1    Nov. 3, 2022

(51) Int. Cl.
*G01C 3/08* (2006.01)
*G01S 7/487* (2006.01)
*G01S 17/89* (2020.01)

(52) U.S. Cl.
CPC ............ *G01S 17/89* (2013.01); *G01S 7/4876* (2013.01)

(58) Field of Classification Search
CPC ............................... G01S 17/89; G01S 7/4876
See application file for complete search history.

(56) References Cited

U.S. PATENT DOCUMENTS

| | | | |
|---|---|---|---|
| 9,885,778 B2 | 2/2018 | Dussan | |
| 9,910,136 B2 | 3/2018 | Heo et al. | |
| 10,634,793 B1 | 4/2020 | Siao et al. | |
| 2017/0234977 A1 | 8/2017 | Kim | |
| 2018/0299552 A1 | 10/2018 | Shu et al. | |
| 2019/0293770 A1* | 9/2019 | Subasingha | ........... G01S 7/4865 |

(Continued)

FOREIGN PATENT DOCUMENTS

| | | |
|---|---|---|
| CN | 104463872 B | 3/2015 |
| CN | 104952107 A | 9/2015 |
| CN | 106054208 B | 10/2016 |

(Continued)

OTHER PUBLICATIONS

Wang, Xiao, et al., Adaptive Noise Filtering for Single Photon Lidar Observations, IEEE, 2017, 4 pgs., Houston, Texas USA.

(Continued)

*Primary Examiner* — Mark Hellner
(74) *Attorney, Agent, or Firm* — McDonnell Boehnen Hulbert & Berghoff LLP

(57) ABSTRACT

An example method and system for filtering point cloud data includes obtaining point cloud data from a LIDAR device. The point cloud data may include at least a first pulse-length range and a second pulse-length range. The first range may include one or more first-length pulses and the second range may include one or more second-length pulses. The method may further include filtering the point cloud data by determining respective magnitudes of each of the one or more first-length pulses and each of the one or more second-length pulses, comparing the magnitudes of the first-length pulses to a first threshold, comparing the magnitudes of the second-length pulses to a second threshold, and removing any pulses having a magnitude less than the respective thresholds. The method may further include determining, based on the filtered point cloud data, objects in an environment around the LIDAR.

20 Claims, 5 Drawing Sheets

(56) References Cited

U.S. PATENT DOCUMENTS

| | | | |
|---|---|---|---|
| 2020/0379096 A1 | 12/2020 | Zhou et al. | |
| 2022/0035035 A1* | 2/2022 | Zhu | G01S 7/4873 |

FOREIGN PATENT DOCUMENTS

| | | |
|---|---|---|
| CN | 106643671 B | 5/2017 |
| CN | 106997049 B | 8/2017 |
| CN | 109024199 A | 12/2018 |
| CN | 109934120 A | 6/2019 |
| CN | 110109142 A | 8/2019 |
| CN | 110428490 A | 11/2019 |
| CN | 110728747 A | 1/2020 |
| CN | 110866449 A | 3/2020 |
| CN | 111722196 A | 9/2020 |
| CN | 111736137 B | 10/2020 |
| CN | 111766600 A | 10/2020 |
| CN | 111812670 A | 10/2020 |
| CN | 111830469 A | 10/2020 |
| CN | 111861946 A | 10/2020 |
| KR | 101666937 B1 | 10/2016 |
| KR | 101956009 | 3/2019 |
| KR | 101978609 | 5/2019 |
| KR | 20190046557 | 5/2019 |
| WO | WO 20200139380 * | 7/2020 .......... G01S 7/4873 |
| WO | 2020154967 A1 | 8/2020 |
| WO | 2020215252 A1 | 10/2020 |
| WO | WO 2021/026241 | 2/2021 |

OTHER PUBLICATIONS

Selver, M. Alper, Interpolating and Denoising Point Cloud Data for Computationally Efficient Environment Modeling, IEEE, 2016, 6 pgs.

International Search Report and Written Opinion from International Application No. PCT/US2022/024199, dated Jul. 28, 2022.

* cited by examiner

US 12,164,031 B2

METHOD AND SYSTEM FOR A THRESHOLD NOISE FILTER

BACKGROUND

Unless otherwise indicated herein, the materials described in this section are not prior art to the claims in this application and are not admitted to be prior art by inclusion in this section.

A Light Detection and Ranging (LIDAR) device is used for sensing aspects of an environment. In operation, one or more light emitters emit light into an environment surrounding the LIDAR device, and one or more light detectors may detect reflected light. Based on time differences between light emissions and receiving the reflected light, the LIDAR device can generate data that can be used to generate three-dimensional (3D) point cloud data that can be interpreted to render a representation of the environment.

In LIDAR systems, noise may add erroneous points to gathered point clouds making it difficult to draw distinct boundaries around objects. Noise may also lead to incorrect identification of objects. Currently, one method for reducing noise is to filter the return pulses that have been detected. The filter may utilize a universal filter for filtering out any pulses that are not at or above a threshold level. The detected pulses may need to reach a threshold length or strength to determine if the return pulse was sensed. Based on a detected light pulse exceeding the threshold signal level, the method may determine that a return light pulse of the emitted light pulse has been detected. Since noise typically manifests at shorter pulse lengths, the threshold may be set so that pulses below a certain length are filtered out. However, as the threshold increases, reflected light pulses from the emitted light pulse that are not noise but do not reach the threshold could be erroneously filtered out. In other words, the longest pulses may be registered, but short pulses, even if they are not noise, may be filtered out. Thus the resulting point cloud could be less accurate.

SUMMARY

The present disclosure generally relates to a method of post pulse detection noise filtering. Particularly, a computing system may determine that a plurality of pulses have been detected and then filter the pulses by comparing the pulse magnitudes to pulse threshold filters based on pulse lengths and ambient background light. By setting different threshold filters depending on pulse length and background, the method may both reduce the number of noise pulses considered and reduce the number of return pulses from the emitted light pulses that are erroneously filtered out. The result of the method may be to increase confidence in detecting physical objects through LIDAR and create greater point cloud detail.

In one aspect, the present application describes a method of filtering noise from a light detection and ranging (LIDAR) point cloud. The method may include obtaining point cloud data from a LIDAR device. The point cloud data may include at least a first pulse-length range and a second pulse-length range. The first pulse-length range may include one or more first-length pulses detected by the LIDAR device and the second pulse-length range could include one or more second-length pulses detected by the LIDAR device. The method may further include filtering the point cloud data. Filtering may include determining respective magnitudes of each of the one or more first-length pulses and each of the one or more second-length pulses, comparing the respective magnitudes of the one or more first-length pulses to a first threshold and removing any first-length pulse having a respective magnitude that is less than the first threshold, and comparing respective magnitudes of the one or more second-length pulses to a second threshold and removing any second-length pulse having a respective magnitude that is less than the second threshold. The method may further include determining, based on the filtered point cloud data, objects in an environment around the LIDAR.

In another aspect, the present application describes a non-transitory computer-readable storage medium having stored thereon instructions that, when executed by a computing device, cause the computing device to perform operations. The operations may include obtaining point cloud data from a LIDAR device. The point cloud data may include at least a first pulse-length range and a second pulse-length range. The first pulse-length range may include one or more first-length pulses detected by the LIDAR device and the second pulse-length range could include one or more second-length pulses detected by the LIDAR device. The method may further include filtering the point cloud data. Filtering may include determining respective magnitudes of each of the one or more first-length pulses and each of the one or more second-length pulses, comparing the respective magnitudes of the one or more first-length pulses to a first threshold and removing any first-length pulse having a respective magnitude that is less than the first threshold, and comparing respective magnitudes of the one or more second-length pulses to a second threshold and removing any second-length pulse having a respective magnitude that is less than the second threshold. The method may further include determining, based on the filtered point cloud data, objects in an environment around the LIDAR.

In yet another aspect, the present invention describes a system for post pulse detection noise filtering by setting pulse thresholds for pulse magnitude based on pulse length. The system may include a LIDAR device, and a controller. The controller may include at least one processor and a non-transitory computer-readable medium. The non-transitory computer-readable medium may store a set of program instructions to be executed by the at least one processor so as to carry out operations. The operations may include obtaining point cloud data from a LIDAR device. The point cloud data may include at least a first pulse-length range and a second pulse-length range. The first pulse-length range may include one or more first-length pulses detected by the LIDAR device and the second pulse-length range could include one or more second-length pulses detected by the LIDAR device. The method may further include filtering the point cloud data. Filtering may include determining respective magnitudes of each of the one or more first-length pulses and each of the one or more second-length pulses, comparing the respective magnitudes of the one or more first-length pulses to a first threshold and removing any first-length pulse having a respective magnitude that is less than the first threshold, and comparing respective magnitudes of the one or more second-length pulses to a second threshold and removing any second-length pulse having a respective magnitude that is less than the second threshold. The method may further include determining, based on the filtered point cloud data, objects in an environment around the LIDAR.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
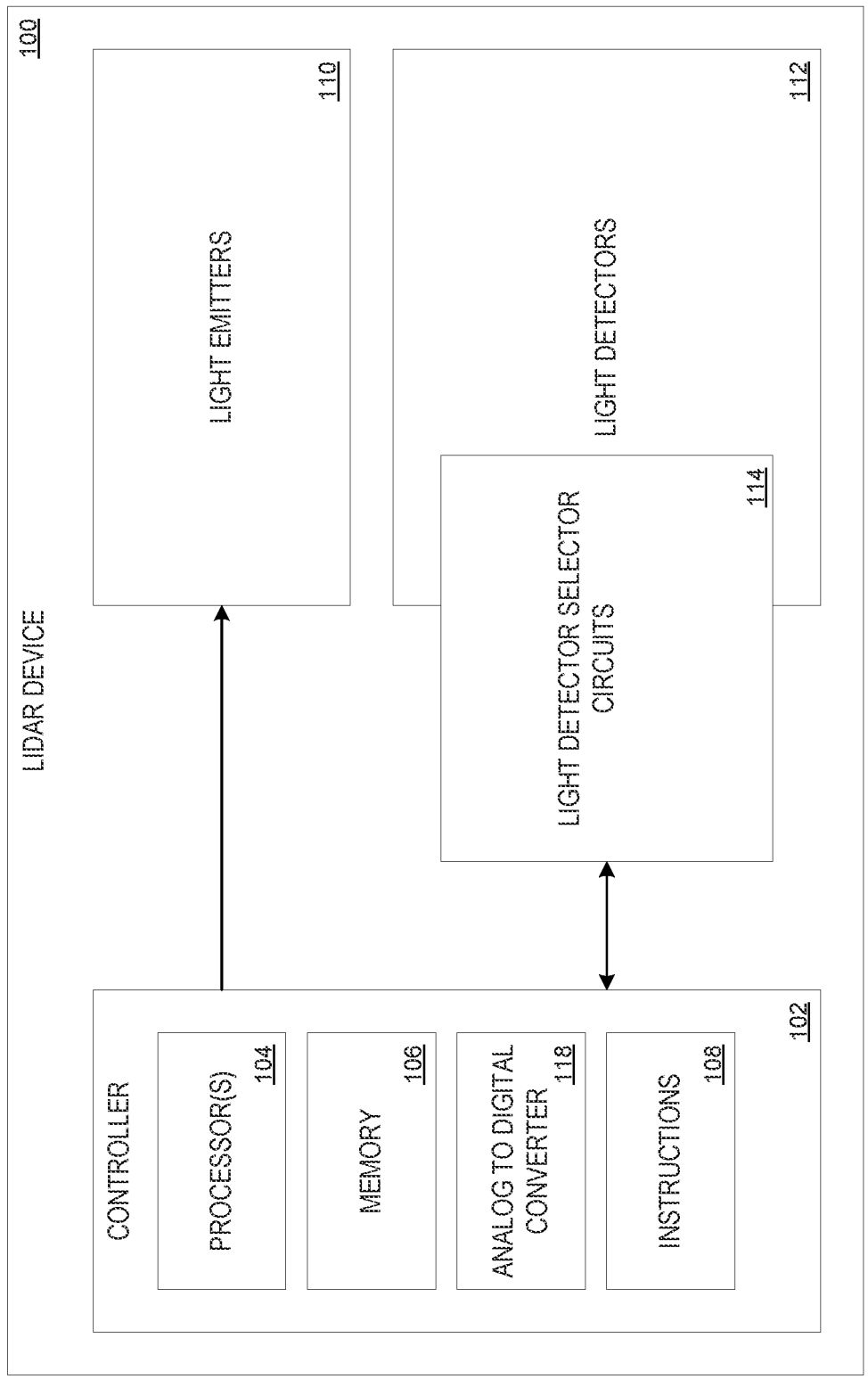
FIG. 1 is a block diagram of a LIDAR device, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As LIDAR systems gather data during operation and create point clouds, noise may add spurious points to the point clouds that may make it difficult to draw distinct boundaries around objects. The noise and indistinct boundaries may also lead to incorrect identification of objects. In example implementations, noise could be caused by ambient light (e.g., light from the sun) in the environment surrounding the LIDAR, or by electronics interference Conventionally, filters can be used to reduce the amount of noise. For example, one method of filtering is to set a universal threshold filter for all return pulses based on either length or strength. This previous method for filtering may further include, based on a returned light pulse exceeding the threshold signal level, determining that the reflected light pulse of the emitted light pulse has been detected. However, as the level of background light in the environment increases, the threshold must also increase in order to filter out the greater occurrence of noise that happens in bright environments. As the threshold rises, the previous methods for filtering may actually filter out reflected light pulses from an emitted light pulse. In other words, high amplitude pulses may be registered, but low amplitude pulses, even if they are not noise, may be filtered out. Thus the resulting point cloud may be less accurate.

In some embodiments, the present disclosure can include a method of post pulse detection noise filtering that combines both pulse length and pulse strength to develop a more accurate noise filter. The method may reduce the number of reflected light pulses from the emitted light pulse erroneously filtered out, thus improving post detection image construction and object detection. The filter may be implemented by assigning different threshold filters for different levels of ambient background light depending on pulse length and filtering based on the detected pulses' magnitudes. Specifically, the method may include obtaining point cloud data from a LIDAR device. The gathered point cloud data may include multiple pulses detected for each pulse emitted by the LIDAR. The detected pulses may include a variety of lengths including at least one or more first-length pulses and one or more second-length pulses. The length of a pulse can be the number of samples in a digitized pulse. In other words, once a return pulse is detected, the computing system can convert the pulse from analog to digital. The digitized pulse can include a plurality of samples spanning the duration of the pulse. The number of samples represents the length of the pulse. For example, a pulse length with a length of 6 can mean an analog pulse converted into a digital form by sampling the analog pulse six times at a predetermined sampling rate. For pulses sampled at the predetermined sampling rate, a pulse with a large number of samples may be referred to as long, while a pulse with less samples may be referred to as short. In an example embodiment, the post pulse detection noise filtering can also be generalizable to a different predetermined sampling rate being used.

In an example embodiment, the pulses may be grouped into different pulse length ranges such that the first-length pulses may have pulse lengths in a first pulse-length range and one or more second-length pulses have pulse lengths in a second pulse-length range. In an additional embodiment, there may be a plurality of grouped pulse length ranges. For example, there can be pulses in a third pulse-length range, fourth pulse-length range, and fifth pulse-length range.

The obtained point cloud data may then be filtered to remove noise. In an example embodiment, the process for filtering out noise may remove noise points from the point cloud, while reducing the number of reflected light pulses from the emitted light pulse erroneously removed. Filtering may include determining respective magnitudes of each of the one or more first-length pulses and each of the one or more second-length pulses, where the magnitudes may indicate the strength of each of the one or more first-length pulses and each of the one or more second-length pulses. Filtering may then include comparing the respective magnitudes of the one or more first-length pulses to a first threshold and the respective magnitudes of the one or more second-length pulses to a second threshold. The thresholds may also be referred to hereinafter as magnitude thresholds. Any pulses with a respective magnitude less than their respective associated thresholds may then be removed. Based on the filtered point cloud data, objects in an environment around the LIDAR may be determined.

To filter out noise while retaining reflected light pulses from an emitted light pulse, the magnitude thresholds for each pulse length range can be individually tuned, given that noise appears at different rates across pulse lengths. This may allow for filters that account for each pulse length range instead of a global filter across all lengths. To select the magnitude threshold, the method determines a permissible number of noise points that can appear in the point cloud and distributes the permissible number of noise points amongst the different pulse length ranges for consideration when setting the threshold. Thus, each pulse length range may be given a portion of the total number of permissible number of noise points.

The number of permissible noise points allotted to each pulse length may be different because of the amount of noise that typically occurs at each pulse length. Particularly, more noise typically occurs at short pulse lengths than at long pulse lengths. Generally, noise pulses are caused by ambient optical background light and have smaller amplitudes than pulses caused by reflection of a laser beam. The difference in amplitude may be because lasers used in LIDAR applications are more powerful per unit area than ambient optical background light. The power difference may result in the amplitude of the pulses due to ambient optical background light being smaller. Thus, the noise pulses typically have short pulse lengths.

In an example embodiment, a small number of noise points may occur at pulse lengths with a length of 9, while a large number of noise points may occur at pulse lengths with a length of 2 due to ambient optical background light. Therefore, the magnitude threshold for pulse length 2 may be higher than the magnitude threshold length 9 in order to filter out more noise. In this example, even if the threshold for pulse length 9 is low enough to let in all of the noise from pulse length 9, the amount of noise over the pulse length 9 threshold may still be less than the amount of noise over the length 2 threshold because less noise typically occurs at longer pulse lengths. In other words, when optimizing the magnitude threshold for each length, the threshold is more permissive the longer the pulse length. Further, for pulse lengths that typically have high signals, and low amounts of noise, it may be beneficial to set a lower threshold. By setting a lower threshold, more signal is let in while only a small amount of noise may be let in, as opposed to using a global threshold filter across pulse lengths which could result in filtering out signal thereby producing a less accurate point cloud.

The magnitude threshold may also utilize a range dependence. Because the magnitude threshold is a function of pulse length and ambient background light, lowering the threshold may also assist in allowing in signals from far away objects. Typically the strength of the pulses that are reflected from far off objects are weaker than the pulses that are reflected from objects that are closer. To accommodate for the range dependence, the threshold may be more permissive as range increases. A more permissive threshold could mean allowing in a greater amount of noise. However, to compensate for the greater amount of noise coming in at the threshold for the farther distance, the thresholds for the nearer distances could be more strict in order to balance the amount of total noise. Thus, the final number of noise points allowed in may be equal to the predetermined permissible number of noise points.

The threshold may also be chosen depending on the different optical backgrounds due to the rate of noise occurring differently as ambient background light varies. Therefore, different optical backgrounds may have their own set of magnitude thresholds for the different pulse lengths. This may increase the number of pulses analyzed by allowing in points for a given background that may have previously been blocked by the biasing threshold. For example, the biasing threshold could be a threshold based on detector dark counts or input referred noise of the analog front end electronics.

An example embodiment may include a system for post pulse detection noise filtering by setting individual pulse thresholds based on pulse magnitudes for different pulse length ranges. The system may include a LIDAR device. FIG. 1 is a block diagram of a LIDAR device, according to an example embodiment. In particular, FIG. 1 shows a LIDAR device 100 having a controller 102, a plurality of light emitters 110 and a corresponding plurality of light detectors 112.

Controller 102 includes at least one processor(s) 104, at least one analog to digital converter 118, and a memory 106. The memory 106 may include a computer readable medium, such as a non-transitory computer readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc. Other types of storage devices, memories, and media are also contemplated herein.

The non-transitory computer-readable medium may also store a set of program instructions 108 executable by the processor(s) 104 to perform operations. The at least one processor(s) 104 can include one or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are also contemplated herein.

The program instructions 108 may be configured to perform operations including obtaining point cloud data from the LIDAR device. The point cloud data may be obtained from operation of the LIDAR device and may take the form of a three-dimensional point cloud that indicates objects detected in the environment of the LIDAR. The point cloud data may include one or more first-length pulses detected by the LIDAR device and one or more second-length pulses detected by the LIDAR device. The point cloud data may include multiple pulses of varying length detected for each emitted pulses and pulses that are within a similar length range may be grouped together. Lengths that are within a predetermined range may be grouped together such that the one or more first-length pulses may be included in a first pulse-length range and the one or more second-length pulses may be included in a second pulse-length range. Although two pulse lengths and two pulse ranges are generally discussed, the detected pulses could be an infinite number of lengths and could be grouped into more than two pulse-length ranges. For example, the detected pulses could be grouped into ten different pulse-length ranges each compared to a respective threshold.

Further, in an example embodiment, the processor 104 in the LIDAR system 100 may filter the point cloud data to reduce the amount of noise present. Specifically, the filter may set magnitude thresholds for pulses on a per pulse length basis. The processor 104 may first determine respective magnitudes of each of the one or more first-length pulses and each of the one or more second-length pulses. The magnitude of a pulse may be a summation of the pulse's digitized voltage. The LIDAR device may detect a pulse and the processor may convert the detected pulse's analog signal into a digitized voltage. The digitized voltage may then be summed to determine the pulse's magnitude.

Filtering may further include comparing the respective magnitudes of the one or more first-length pulses to a first threshold and removing any first-length pulse having a respective magnitude that is less than the first threshold, and comparing respective magnitudes of the one or more second-length pulses to a second threshold and removing any second-length pulse having a respective magnitude that is less than the second threshold. Based on the filtered data, the processor may determine objects in an environment around the LIDAR.

In some embodiments, the pulse lengths may be grouped together such that a group of pulse lengths includes a plurality of sub-pulse lengths. By grouping pulse lengths, the computing system may set one threshold per group and thus the filtering may be less complex and take less processing power. For example, the first-length pulses may not all be the same length, but may include a range of pulse lengths that fall within a portion of the first pulse-length range. Similarly, the second-length pulses may include a range of pulse lengths that fall within a portion of the second pulse-length range. For example, the first-length pulses may have lengths ranging from 7 to 9. The first-length pulses may be divided into a first sub-pulse-length range that includes pulse lengths from 7 to 8 and a remainder of first-length pulses with lengths from 8 to 9 in a first remainder sub-pulse-length range. As illustrated, the first sub-pulse-length range may be a portion of the first pulse-length range. The magnitudes of all of the first-length pulses may be compared to the first threshold. Alternatively, the computing system could set a threshold for every pulse length individually, or set thresholds for smaller groupings of pulse lengths. The magnitudes of the pulses in the first sub-pulse-length range, lengths 7 to 8, can be compared to a first sub-pulse threshold, while the magnitudes of the first remainder sub-pulse-length range, lengths 8 to 9, can be compared to the first threshold. Similarly, the second-length pulses may have lengths ranging from 5 to 7. The second-length pulses may be divided into a second sub-pulse-length range that includes pulse lengths from 5 to 6 and a remainder of second-length pulses with lengths from 6 to 7 in a second remainder sub-pulse-length range. As illustrated, the second sub-pulse-length range may be a portion of the second pulse-length range. The magnitudes of the pulses in the second sub-pulse-length range, lengths 5 to 6, can be compared to a second sub-pulse threshold, while the magnitudes of the second remainder sub-pulse-length range, lengths 6 to 7, can be compared to the second threshold. Alternatively, all of the magnitudes of the second-length pulses may be compared to the second threshold.

Further, in an example embodiment, the first length-pulses may be longer than the second length-pulses and thus pulses within the first sub-pulse-length range may be longer than the pulses within the second sub-pulse-length range. Because the first-length pulses and respective pulse-length ranges are different lengths than the second-length pulses and respective pulse-length ranges, the first-length pulses and the second-length pulses may be compared to different respective magnitude thresholds to more precisely filter out noise depending on pulse length. When the first length-pulses are longer than the second length-pulses, or are grouped into a longer pulse length range, the first length-pulses may be compared to a threshold that is lower than the second magnitude threshold. Noise may occur more frequently at shorter pulse lengths, and less frequently at longer pulse lengths. Therefore, the magnitude threshold associated with the longer pulse length may be lower so that reflected light pulses from an emitted light pulse are not erroneously filtered out, while the magnitude threshold associated with the shorter pulse length may be higher to filter out more noise. In an alternative embodiment, the second pulse-length could be longer than the first pulse length, and the second threshold could be lower than the first threshold.

At times, the amount of ambient background light in the environment can affect the amount of noise detected by the LIDAR. For example, environments with bright ambient backgrounds may correlate to more noise as light reflects off of nearby objects in the environment. In environments with bright ambient backgrounds, the thresholds may be high in order to filter out noise. Alternatively, in environments with dark ambient backgrounds, there may not be as much noise caused by light reflecting off of objects in the environment. Therefore, in environments with dark ambient backgrounds, the threshold for filtering noise could be low. In an example embodiment, the one or more first-length pulses and the one or more second-length pulses may be detected in an ambient background classified as dark or light. Further, the first threshold and the second threshold may be based on the ambient background light.

FIG. 1 also shows a plurality of light detector selector circuits 114. The program instructions 108 are stored on memory 106 and executable by the processor(s) 104 to perform functions related to controlling the light detector selector circuits 114 and functions corresponding to filtering point cloud data. The program instructions 108 are further executable to perform functions related to selecting and powering the plurality of light emitters 110.

In an example embodiment, the LIDAR device 100 may be configured to emit light pulses into an environment and to detect light pulses. The detected light pulses may originate from a plurality of sources. For example, detected light pulses may result from reflections of the emitted light pulses by one or more objects in the environment. These are the light pulses that the LIDAR device 100 may emit in accordance with the instructions 108. These pulses may be desirable to keep. Alternatively, the detected light pulses may be the result of ambient light in the environment. Detected light pulses resulting from ambient light could appear in the point cloud as noise that may be desirable to filter out. Noise may also be caused by the operation of electronics in the LIDAR device 100.

As previously discussed, the detected light pulses in the point cloud may be filtered to reduce or remove the amount of noise present. By reducing the amount of noise in filtered point cloud data, the filtered point cloud data could become more reliable. However, the filtered point cloud data may still include a permissible number of noise points without reducing the reliability of the point cloud data. The permissible number of noise points may be based on the amount of noise points that a downstream processing system can handle. For example, if the downstream processing system has to process too many noise points, the system may not be able to handle the number of noise points and may break. Additionally or alternatively, the permissible number of noise points could be based on the amount of noise before the clarity of a gathered point cloud starts to become distorted. For example, if the downstream processing system cannot discern an object in the point cloud data, three may be too many noise points. The resulting filtered point cloud data may include a plurality of returning light pulses resulting from reflections of emitted light pulses by one or more objects in the environment and a number of permissible noise pulses resulting from ambient light in the environment.

The light detectors 112 can receive reflections from light pulses of the light emitters 110. Once the pulses are filtered, and based on the instructions 108, the controller 102 can use values (e.g., voltage and/or current) sampled from the light detectors to generate 3D point cloud data, and can process the 3D point cloud data (or perhaps facilitate processing the 3D point cloud data by another computing device, such as the system controller of a system associated with the LIDAR device 100, such as a vehicle controller of a vehicle). Though FIG. 1 depicts a plurality of light emitters and corresponding light detectors it should be understood that a LIDAR device may include a single light emitter. For example, a single light emitter can be used in conjunction with one or more movable mirrors to produce a plurality of beams of light. The functionality described herein may be carried out in single-emitter configurations and in multiple-emitter configurations.

The controller 102 can determine 3D point cloud data by using the light emitters 110 to emit pulses of light. A time of emission is established for each light emitter and a relative location at the time of emission is also tracked. Aspects of an environment of the LIDAR device 100, such as various objects, reflect the pulses of light. For example, when the LIDAR device 100 is in an environment that includes a road, such objects may include vehicles, signs, pedestrians, road surfaces, construction cones, or the like. Some objects may be more reflective than others, such that an intensity of reflected light may indicate a type of object that reflects the light pulses. Further, surfaces of objects may be at different positions relative to the LIDAR device 100, and thus take more or less time to reflect portions of light pulses back to the LIDAR device 100. Accordingly, the controller 102 may track a detection time at which a reflected light pulse is detected by a light detector and a relative position of the light detector at the detection time. By measuring time differences between emission times and detection times, the controller 102 can determine how far the light pulses travel prior to being received, and thus a relative distance of a corresponding object. By tracking relative positions at the emission times and detection times the controller 102 can determine an orientation of the light pulse and reflected light pulse relative to the LIDAR device 100, and thus a relative orientation of the object. By tracking intensities of received light pulses, the controller 102 can determine how reflective the object is. The 3D point cloud data determined based on this information may thus indicate relative positions of detected reflected light pulses (e.g., within a coordinate system, such as a Cartesian coordinate system) and intensities of each reflected light pulse.

In LIDAR operations, it may be desirable to filter detected point cloud data to remove noise. However, applying a global noise filter to all of the pulses in a point cloud may remove not only noise, but also reflected light pulses from an emitted light pulse. Example embodiments may include a method of post pulse detection noise filtering including applying individual threshold filters to each category of pulse length. Pulses that do not have a strength that reaches or exceeds the threshold filter may be removed from consideration. Further, the threshold filters may be adjusted depending on the amount of ambient background light.

Figure 2:
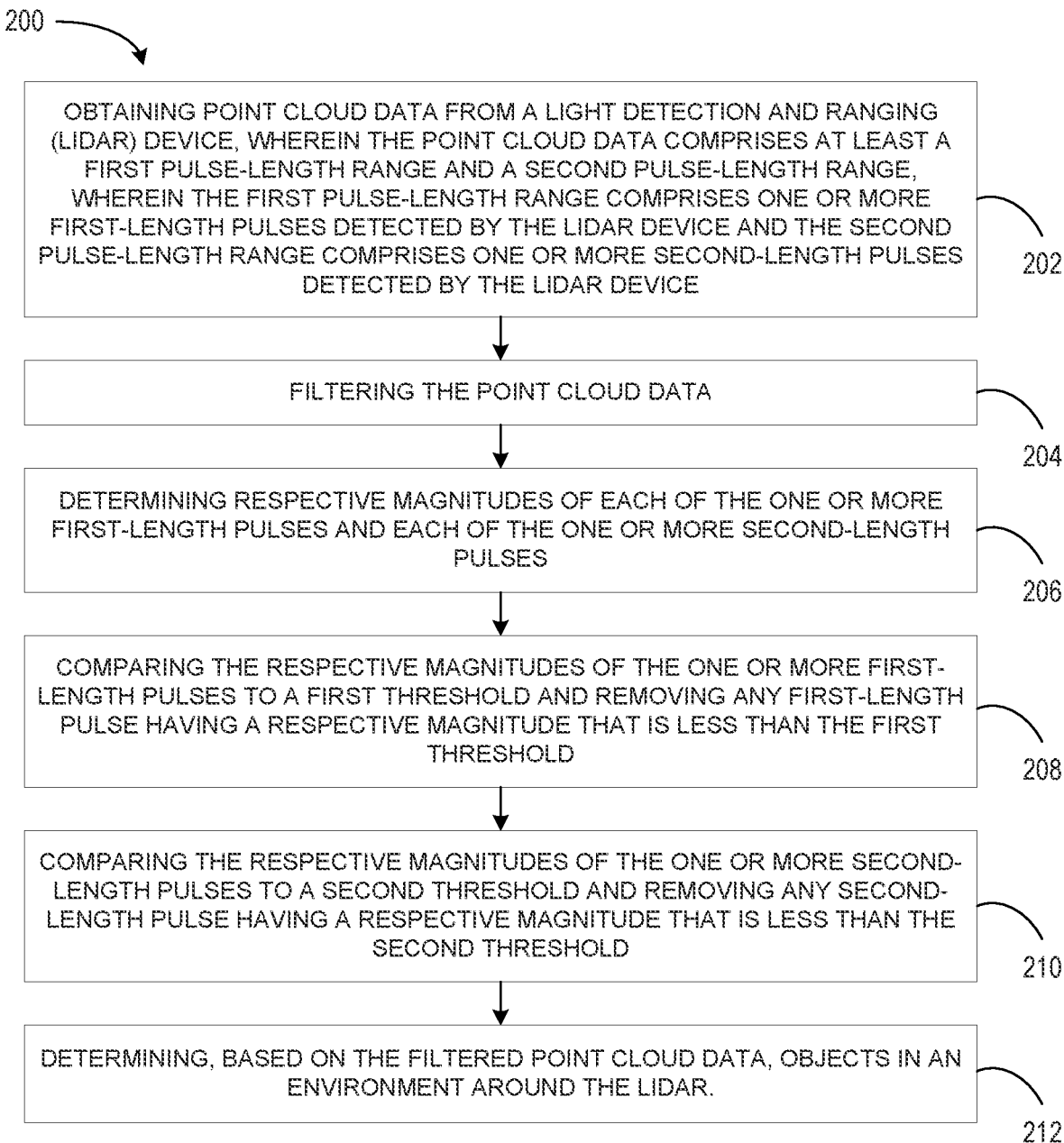
FIG. 2 is a flow chart illustrating a method, according to an example embodiment.

FIG. 2 illustrates a block diagram of a method according to an example embodiment. In particular, FIG. 2 depicts a method 200 for use in post point cloud detection noise filtering. Method 200 may be implemented in accordance with LIDAR device 100. For example, aspects of the functions of method 200 may be performed by controller 102.

At block 202, method 200 may include, obtaining point cloud data from a LIDAR device. The point cloud data gathered may represent objects in the environment surrounding the LIDAR. For example, the LIDAR could be positioned on an autonomous vehicle. When positioned on an autonomous vehicle, the point cloud data could represent, for example, roads, other vehicles, pedestrians, or street signs. Further, during operation, the point cloud data could include objects located at different distances from the LIDAR. In an example embodiment, the point cloud data could include one or more first-length pulses detected by the LIDAR device and one or more second-length pulses detected by the LIDAR device. Further, the first-length pulses may be grouped together in a first pulse-length range. For example, the first-length pulses may be in a range from 8-9, or 8-8.9. The second-length pulses may also be grouped together in a second pulse-length range. For example, the second-length pulses may be in a range from 2-3, or 2-2.9.

At block 204, method 200 may include, filtering the point cloud data. By filtering the point cloud data, the method may remove noise points while retaining points from pulses that were truly emitted and returned. At block 206, filtering may include, determining respective magnitudes of each of the one or more first-length pulses and each of the one or more second-length pulses. The magnitude may be the strength of the pulse. In an example embodiment, determining respective magnitudes of each of the one or more first-length pulses and each of the one or more second-length pulses includes obtaining an analog signal for each of the one or more first-length pulses and each of the one or more second-length pulses from the LIDAR device and converting the analog signal for each of the one or more first-length pulses and each of the one or more second-length pulses into a summed digitized voltage.

At block 208, filtering for method 200 may include, comparing the respective magnitudes of the one or more first-length pulses to a first threshold and removing any first-length pulse having a respective magnitude that is less than the first threshold. Any of the first-length pulses with a magnitude as great as, or greater than the first threshold magnitude may be kept as part of the filtered point cloud data. Similarly, at block 210, filtering for method 200 may include comparing respective magnitudes of the one or more second-length pulses to a second threshold and removing any second-length pulse having a respective magnitude that is less than the second threshold. Any of the second-length pulses with a magnitude as great as, or greater than the first threshold magnitude may be kept as part of the filtered point cloud. The first-length pulses and the second-length pulses may be different lengths and may therefore be compared to different thresholds. The first-length pulses and the second-length pulses may be compared to different thresholds in an attempt to more accurately filter out noise while saving real pulses.

At block 212, the method 200 may include, determining, based on the filtered point cloud data, objects in an environment around the LIDAR. The filtered point cloud data could be used to construct a more accurate point cloud of the environment. The filtered point cloud data could also be used to determine objects in the environment which could contribute to navigation instructions for an autonomous vehicle. Alternatively, the filtered results could be sent for further processing.

Within examples, method 200 further includes that the LIDAR device may be configured to emit light pulses into an environment and to detect light pulses. The detected light pulses may be the result of both reflections of the emitted light pulses by one or more objects in the environment and ambient light in the environment. The light pulses from reflections of the emitted light pulses may be desirable to keep in the point cloud. Alternatively, the light pulses from ambient light in the environment may constitute noise that may be desirable to filter out. Both of these detected light pulse types are part of the point cloud that is filtered in the method 200.

Once the point cloud is filtered by the method 200, in an example embodiment, the filtered point cloud data may include both a plurality of returning light pulses resulting from reflections of emitted light pulses by one or more objects in the environment and a number of permissible noise pulses resulting from ambient light in the environment. The respective magnitude thresholds for the different pulse lengths may provide an individualized approach for filtering each pulse length such that less of the returning pulses resulting from reflections of emitted light pulses are erroneously filtered out. After filtering, a permissible number of noise points may remain in the filtered point cloud without detracting from the point cloud.

An example embodiment may include determining a number of noise points that are permissible to include in the point cloud so as to reduce the inaccurate effects of noise on the point cloud. The permissible number of noise points may be determined using a known ratio of returning pulses resulting from reflections of emitted light pulses to noise pulses. The known ratio may be determined at various optical background light levels. To determine the ratio, the laser of the LIDAR is turned off and any pulses detected should inherently be noise. Therefore, the computing system can keep track of the number of noise points typically detected for each pulse length at various optical background light levels. Moreover, the computing system can determine and keep track of the typical magnitudes of the noise points for each pulse length at various optical background light levels. When the laser is turned back on, the computing system can then determine the ratio of noise pulses to returning pulses resulting from reflections of emitted light pulses. Since the number of noise pulses is known, the number of returning pulses resulting from reflections of emitted light pulses is the total number of detected pulses minus the number of known noise pulses.

The thresholds for each pulse length may be set at a magnitude that is greater than the typical magnitudes of the noise points for each pulse length at various optical background light levels. Although some noise points may have atypical magnitudes that are allowed over the threshold, the number of return pulses resulting from reflections of emitted light pulses erroneously filtered out is reduced. The permissible number of noise points may also be considered when setting thresholds based on pulse magnitudes for various pulse lengths that reduce the number of return pulses resulting from reflections of emitted light pulses erroneously filtered out. An example embodiment of the method 200 may include selecting the number of permissible noise pulses, and setting the first threshold for pulse magnitude and the second threshold for pulse magnitude based on the number of permissible noise pulses such that the total amount of noise points allowed over the thresholds does not exceed the number of permissible noise points.

The known ratio of returning pulses resulting from reflections of emitted light pulses to noise pulses in point cloud data may be considered when setting the first threshold for the first pulse-length and the second threshold for the second pulse-length to not exceed the number of permissible noise points. For example, if the number of permissible noise points in a point cloud is set as 1000, then the first threshold and the second threshold may be tuned using the known ratios of real pulses to noise pulses. After adjusting the thresholds, the number of noise points in the point cloud may not exceed the 1000 permissible noise points.

When tuning using the known ratio of real pulses to noise pulses and determining the thresholds, the number of permissible noise points may be distributed among the different pulse lengths in a point cloud. When considering setting the threshold, in an example embodiment, the number of permissible noise pulses may include a first number of permissible noise points and a second number of permissible noise pulses. The first number of permissible noise points may be for the first-length pulses and the second number of permissible noise pulses may be for the second-length pulses. The first number of permissible noise points and the second number of permissible noise points may be different amounts. Alternatively, they could be the same amount.

For example, if the number of permissible noise points is set at 1000, based on the ratio and the known magnitudes, the second threshold may be set high enough that only 400 noise points are let in, but 600 noise points may be allowed in over the first threshold. In this example, the first threshold may correspond to a longer pulse length which typically has less noise, so the threshold can be set lower to attempt to reduce the number of return pulses resulting from reflections of emitted light pulses erroneously filtered out. Alternatively, the second threshold may be for a shorter pulse length which typically has more noise, so the threshold can be set higher to filter out more noise.

In an example embodiment, the first number of permissible noise pulses may be greater than the second number of permissible noise pulses. Alternatively, the second number of permissible noise pulses may be greater than the first number of permissible noise pulses. The addition of the first number of permissible noise pulses and the second number of permissible noise pulses should be equal to the total number of permissible noise pulses. Further, the thresholds, and therefore the number of permissible noise pulses for each length, may be different so as to allow in more real points and filter out noise.

Because there is typically less noise that occurs the longer the pulse, the magnitude threshold may be lower as the pulse length increases. By lowering the magnitude threshold needed for longer pulse lengths that typically have less noise, the method may filter out less returning pulses resulting from reflections of emitted light pulses. However, there may be more noise that occurs in shorter pulse length ranges. For shorter pulses the threshold may be higher than the long pulse threshold in order to filter out more noise. The thresholds for the different pulse lengths may be tuned to each other. By tuning the thresholds for each length, the number of returning pulses resulting from reflections of emitted light pulses may be maximized while the number of noise pulses may not exceed the permissible number.

Figure 3:
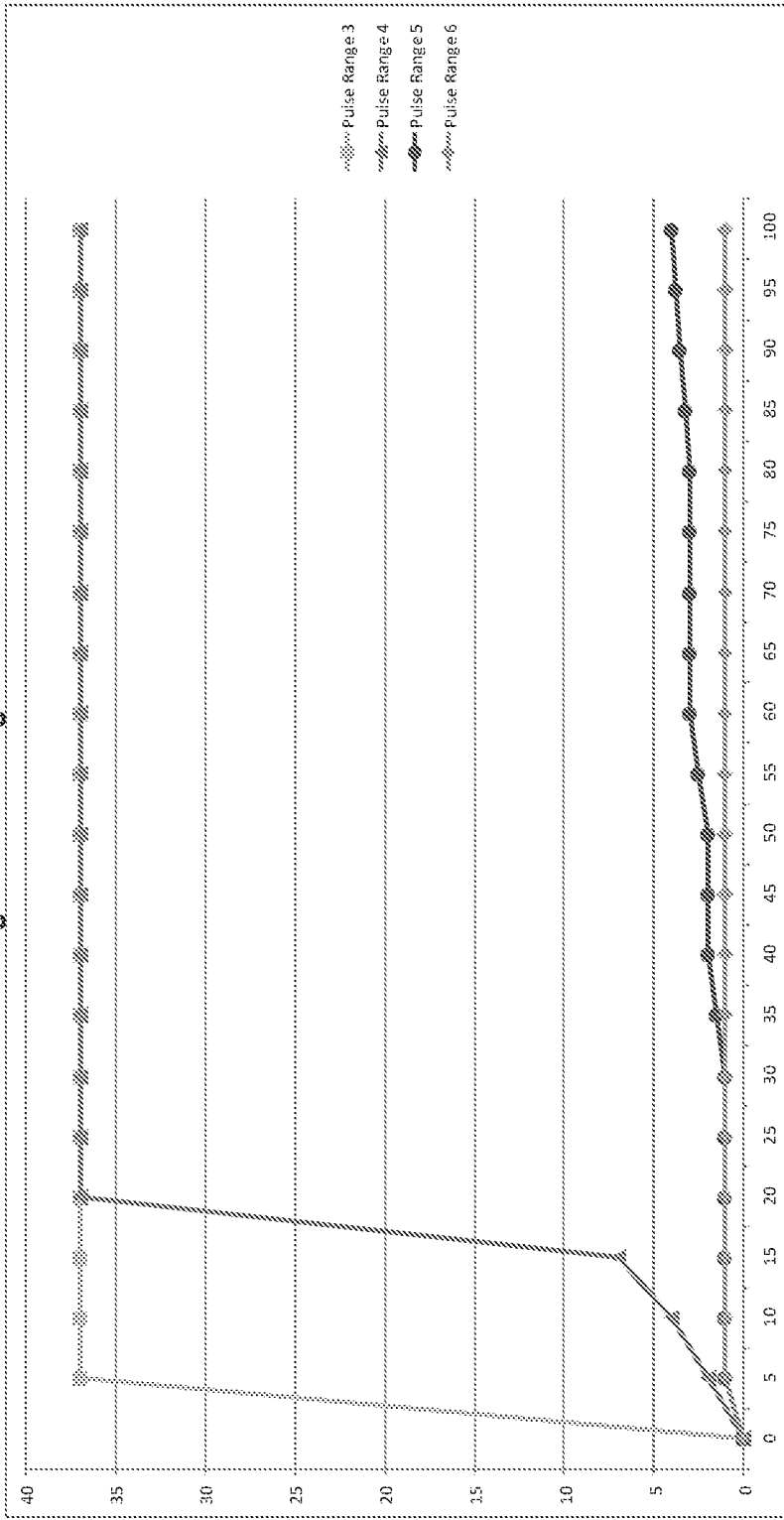
FIG. 3 is a graph of tuned threshold filters, according to an example embodiment.

FIG. 3 illustrates a graph of compensating for leniency according to an example embodiment. In the graph, 1000 permissible noise points were considered. The graph shows how much the threshold could be increased for pulse length 2 when more noise is let in for the longer pulse lengths. For example, if the magnitude threshold is decreased for pulse length 6 so that all of the noise for pulse length 6 is let in, the magnitude threshold for pulse length 2 could be increased to only 4. This is because, at this ambient background light, pulse length 6 does not typically have much noise, so pulse length 2 does not need to be compensated for as much. Alternatively, if 17% of the noise is let in for pulse length 4 at this ambient background light, the magnitude threshold for pulse length 2 should be increased to 37.

Figure 4:
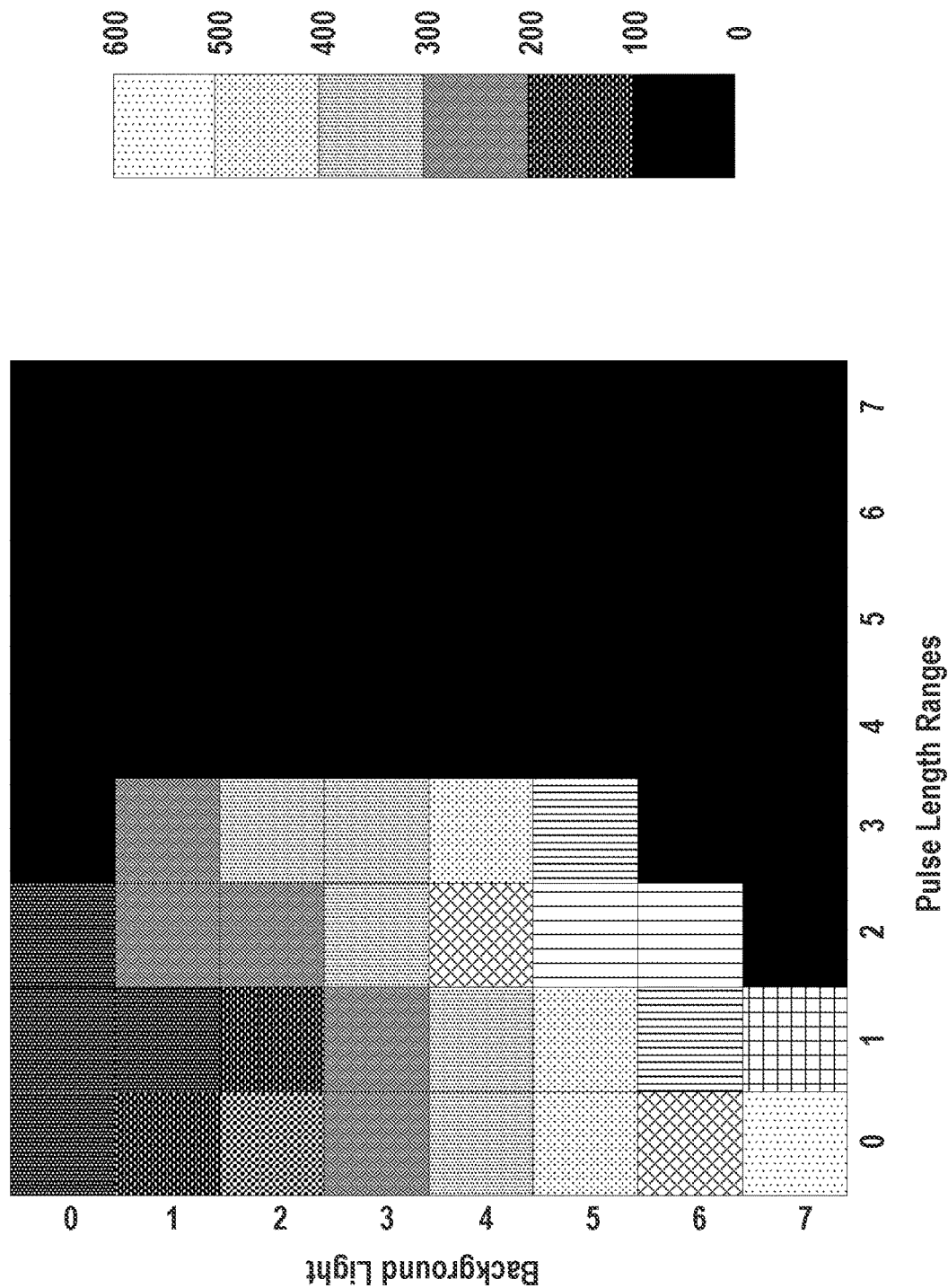
FIG. 4 is a graph of threshold cut offs depending on pulse background and pulse length, according to an example embodiment.

Noise may vary in prevalence at different levels of ambient background light. Therefore, the first threshold and the second threshold should be based on the current ambient background light that the LIDAR is in. The first threshold and the second threshold may change depending on the ambient background light. An example embodiment may further include setting the first threshold and the second threshold based on an ambient background light. The one or more first-length pulses and the one or more second-length pulses may be detected in the ambient background light. FIG. 4 illustrates a gradient scale for threshold, based on pulse length and ambient background light.

Figure 5:
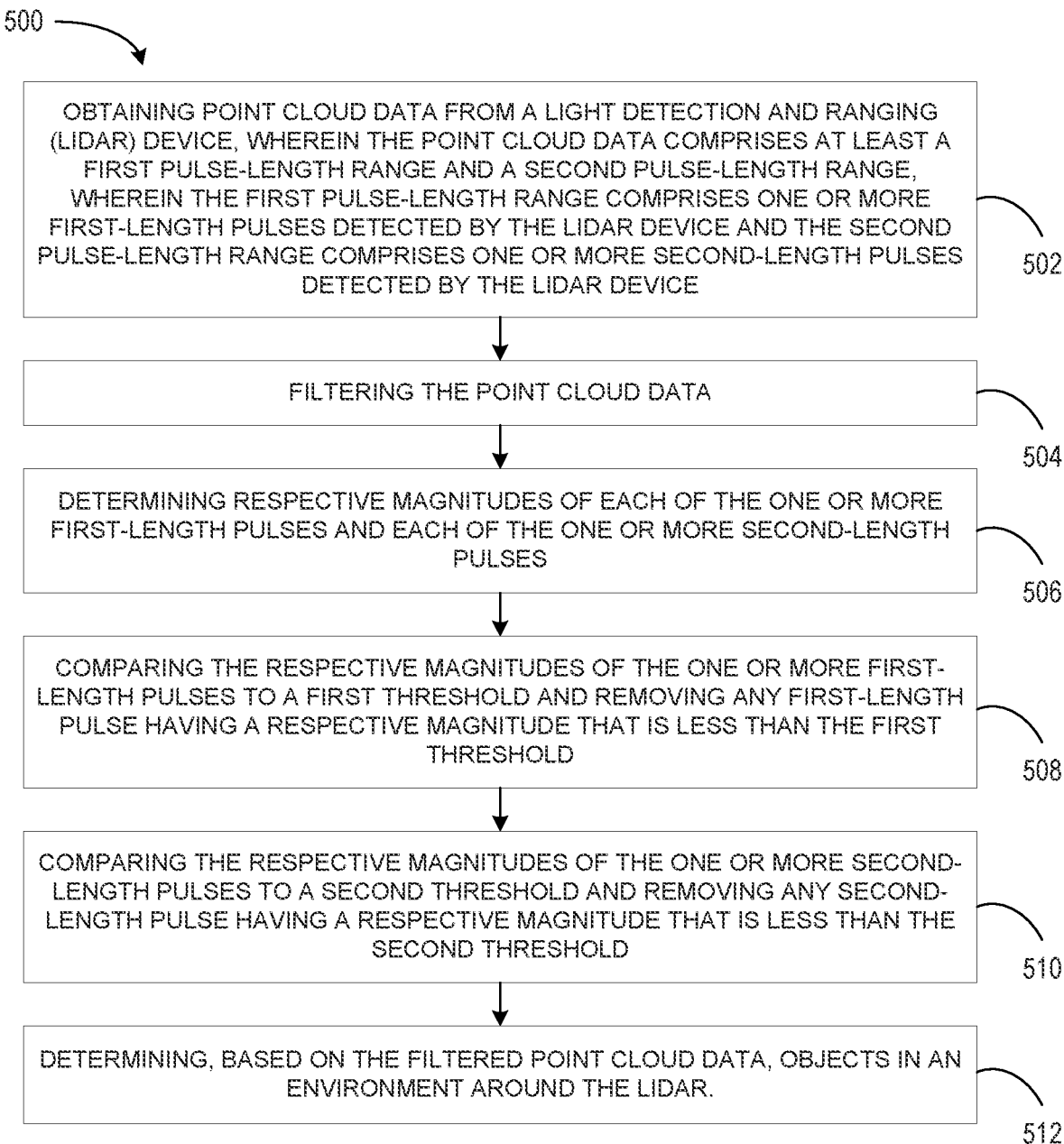
FIG. 5 is a flow chart illustrating a method, according to an example embodiment.

An example embodiment may further include a non-transitory computer-readable storage medium having stored thereon instructions that, when executed by a computing device, cause the computing device to perform operations. FIG. 5 illustrates a block diagram of operations according to an example embodiment. In particular, FIG. 5 depicts operations 500 for use in post point cloud detection noise filtering. Operations 500 may be implemented in accordance with LIDAR device 100. For example, aspects of the functions of operations 500 may be performed by controller 102. At block 502, operations 500 may include obtaining point cloud data from a LIDAR device. The LIDAR device may be configured to emit light pulses into an environment and to detect light pulses resulting from reflections of the emitted light pulses by one or more objects in the environment and ambient light in the environment. The point cloud data may include one or more first-length pulses detected by the LIDAR device and one or more second-length pulses detected by the LIDAR device. The point cloud data may include multiple pulses of varying length detected for each emitted pulses and pulses that are within a similar length range may be grouped together. Lengths that are within a predetermined range may be grouped together such that the one or more first-length pulses may include pulse lengths in a first pulse-length range and the one or more second-length pulses may include pulse lengths in a second pulse-length range. Although two pulse lengths and two pulse ranges are generally discussed, the detected pulses could be an infinite number of lengths and could be grouped into more than two pulse-length ranges. For example, the detected pulses could be grouped into ten different pulse-length ranges each compared to a respective threshold.

At block 504, operations 500 may further include filtering the point cloud data. Filtering may include, at block 506, determining respective magnitudes of each of the one or more first-length pulses and each of the one or more second-length pulses, at blocks 508 and 510 filtering may include comparing the respective magnitudes of the one or more first-length pulses to a first threshold and the one or more second length pulses to a second threshold, and removing any pulses having a respective magnitude that is less than the respective threshold. The filtered point cloud data may include a plurality of returning light pulses resulting from reflections of emitted light pulses by one or more objects in the environment and a number of permissible noise pulses resulting from ambient light in the environment. The operations may further include, at block 512, based on the filtered point cloud data, determining objects in an environment around the LIDAR.

As previously discussed, there may be a permissible amount of noise pulses that can be considered in the point cloud without negatively impacting the point cloud. The operations may include selecting the number of permissible noise pulses, and setting the first threshold and the second threshold based on the number of permissible noise pulses. In an example embodiment, the operations may also include that the first threshold and the second threshold are set based on an ambient background light. The one or more first-length pulses and the one or more second-length pulses may be detected in the ambient background light.

In some embodiments, the pulse lengths may be grouped together such that a group of pulse lengths includes a plurality of sub-pulse length ranges. By grouping pulse lengths, the computing system may set one threshold per group and thus the filtering may be less complex and take less processing power. In an example embodiment, the first-length pulses may include a first sub-pulse-length range that is a portion of the first pulse-length range, and the second-length pulse may include a second sub-pulse-length range that is a portion of the second pulse-length range. The pulses included in the first-length pulses may not necessarily all be the same length. In one embodiment, the pulses may include lengths that are within a portion of the first pulse-length range. Similarly, the second-length pulses may include a range of pulse lengths that fall within a portion of the second pulse-length range. For example, the first-length pulses may have lengths ranging from 7 to 9. The first-length pulses may be divided into the first sub-pulse-length range that includes pulse lengths from 7 to 8 and a remainder of first-length pulses with lengths from 8 to 9 in a first remainder sub-pulse-length range. As illustrated, the first sub-pulse-length range may be a portion of the first pulse-length range. The magnitudes of all of the first-length pulses may be compared to the first threshold. Alternatively, the computing system could set a threshold for every pulse length individually, or set thresholds for smaller groupings of pulse lengths. The magnitudes of the pulses in the first sub-pulse-length range, lengths 7 to 8, can be compared to a first sub-pulse threshold, while the magnitudes of the first remainder sub-pulse-length range, lengths 8 to 9, can be compared to the first threshold. Similarly, the second-length pulses may have lengths ranging from 5 to 7. The second-length pulses may be divided into the second sub-pulse-length range that includes pulse lengths from 5 to 6 and a remainder of second-length pulses with lengths from 6 to 7 in a second remainder sub-pulse length range. As illustrated, the second sub-pulse-length range may be a portion of the second pulse-length range. The magnitudes of the pulses in the second sub-pulse-length range, lengths 5 to 6, can be compared to a second sub-pulse threshold, while the magnitudes of the second remainder sub-pulse-length range, lengths 6 to 7, can be compared to the second threshold. Alternatively, all of the magnitudes of the second-length pulses may be compared to the second threshold.

Further, the first-length pulses may be longer than the second-length pulses and thus pulses within the first sub-pulse-length range may be longer than the pulses within the second sub-pulse-length range. Since the first pulse-lengths include different lengths from the second pulse-lengths, the first-length pulses and the second-length pulses may be compared to different respective thresholds for pulse magnitude to more precisely filter out noise depending on pulse length. When the first length-pulses are longer than the second length-pulses, the first threshold may be lower than the second threshold.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:
    obtaining point cloud data from a light detection and ranging (LIDAR) device, wherein the point cloud data comprises at least a first pulse-length range and a second pulse-length range, wherein the first pulse-length range comprises one or more first-length pulses detected by the LIDAR device and the second pulse-length range comprises one or more second-length pulses detected by the LIDAR device;
    filtering the point cloud data, wherein the filtering comprises:
        determining respective magnitudes of each of the one or more first-length pulses and each of the one or more second-length pulses;
        comparing the respective magnitudes of the one or more first-length pulses to a first threshold and removing any first-length pulse having a respective magnitude that is less than the first threshold; and
        comparing respective magnitudes of the one or more second-length pulses to a second threshold and removing any second-length pulse having a respective magnitude that is less than the second threshold; and
    determining, based on the filtered point cloud data, objects in an environment around the LIDAR.

2. The method of claim 1, wherein the LIDAR device is configured to emit light pulses into an environment and to detect light pulses resulting from (i) reflections of the emitted light pulses by one or more objects in the environment and (ii) ambient light in the environment.

3. The method of claim 2, wherein the filtered point cloud data comprises (i) a plurality of returning light pulses resulting from reflections of emitted light pulses by one or more objects in the environment and (ii) a number of permissible noise pulses resulting from ambient light in the environment.

4. The method of claim 3, further comprising:
    selecting the number of permissible noise pulses; and
    setting the first threshold and the second threshold based on the number of permissible noise pulses.

5. The method of claim 4, wherein the number of permissible noise pulses comprises a first number of permissible noise points and a second number of permissible noise pulses and wherein the first number of permissible noise points comprises the first-length pulses and the second number of permissible noise pulses comprises the second-length pulses.

6. The method of claim 5, wherein the first number of permissible noise pulses is greater than the second number of permissible noise pulses.

7. The method of claim 1, further comprising setting the first threshold and the second threshold based on an ambient background light, wherein the one or more first-length pulses and the one or more second-length pulses are detected in the ambient background light.

8. The method of claim 1, wherein the first-length pulses include a first sub-pulse-length range that is a portion of the first pulse-length range, wherein the second-length pulses include a second sub-pulse-length range that is a portion of the second pulse-length range, wherein the first-length pulses are longer than the second-length pulses, and wherein the first threshold is lower than the second threshold.

9. The method of claim 1, wherein determining respective magnitudes of each of the one or more first-length pulses and each of the one or more second-length pulses comprises obtaining an analog signal for each of the one or more first-length pulses and each of the one or more second-length pulses from the LIDAR device and converting the analog signal for each of the one or more first-length pulses and each of the one or more second-length pulses into a digitized voltage.

10. A non-transitory computer-readable storage medium having stored thereon instructions that, when executed by a computing device, cause the computing device to perform operations comprising:
    obtaining point cloud data from a light detection and ranging (LIDAR) device, wherein the point cloud data comprises at least a first pulse-length range and a second pulse-length range, wherein the first pulse-length range comprises one or more first-length pulses detected by the LIDAR device and the second pulse-length range comprises one or more second-length pulses detected by the LIDAR device;
    filtering the point cloud data, wherein the filtering comprises:
        determining respective magnitudes of each of the one or more first-length pulses and each of the one or more second-length pulses;
        comparing the respective magnitudes of the one or more first-length pulses to a first threshold and removing any first-length pulse having a respective magnitude that is less than the first threshold; and comparing respective magnitudes of the one or more second-length pulses to a second threshold and removing any second-length pulse having a respective magnitude that is less than the second threshold; and determining, based on the filtered point cloud data, objects in an environment around the LIDAR.

11. The non-transitory computer-readable storage medium of claim 10, wherein the LIDAR device is configured to emit light pulses into an environment and to detect light pulses resulting from (i) reflections of the emitted light pulses by one or more objects in the environment and (ii) ambient light in the environment.

12. The non-transitory computer-readable storage medium of claim 11, wherein the filtered point cloud data comprises (i) a plurality of returning light pulses resulting from reflections of emitted light pulses by one or more objects in the environment and (ii) a number of permissible noise pulses resulting from ambient light in the environment.

13. The non-transitory computer-readable storage medium of claim 12, further comprising:

selecting the number of permissible noise pulses; and
setting the first threshold and the second threshold based on the number of permissible noise pulses.

14. The non-transitory computer-readable storage medium of claim 10, further comprising setting the first threshold and the second threshold based on an ambient background light, wherein the one or more first-length pulses and the one or more second-length pulses are detected in the ambient background light.

15. The non-transitory computer-readable storage medium of claim 10, wherein the first-length pulses include a first sub-pulse-length range that is a portion of the first pulse-length range, wherein the second-length pulses include a second sub-pulse-length range that is a portion of the second pulse-length range, wherein the first-length pulses are longer than the second-length pulses, and wherein the first threshold is lower than the second threshold.

16. A system comprising:

a light detection and ranging (LIDAR) device; and
a controller comprising at least one processor and a non-transitory computer-readable medium wherein the non-transitory computer-readable medium stores a set of program instructions, wherein the at least one processor executes the program instructions so as to carry out operations, the operations comprising:

obtaining point cloud data from the LIDAR device, wherein the point cloud data comprises at least a first pulse-length range and a second pulse-length range, wherein the first pulse-length range comprises one or more first-length pulses detected by the LIDAR device and the second pulse-length range comprises one or more second-length pulses detected by the LIDAR device;

filtering the point cloud data, wherein the filtering comprises:

determining respective magnitudes of each of the one or more first-length pulses and each of the one or more second-length pulses;
comparing the respective magnitudes of the one or more first-length pulses to a first threshold and removing any first-length pulse having a respective magnitude that is less than the first threshold; and
comparing respective magnitudes of the one or more second-length pulses to a second threshold and removing any second-length pulse having a respective magnitude that is less than the second threshold; and determining, based on the filtered point cloud data, objects in an environment around the LIDAR.

17. The system of claim 16, wherein the LIDAR device is configured to emit light pulses into an environment and to detect light pulses resulting from (i) reflections of the emitted light pulses by one or more objects in the environment and (ii) ambient light in the environment.

18. The system of claim 17, wherein the filtered point cloud data comprises (i) a plurality of returning light pulses resulting from reflections of emitted light pulses by one or more objects in the environment and (ii) a number of permissible noise pulses resulting from ambient light in the environment.

19. The system of claim 16, further comprising setting the first threshold and the second threshold based on an ambient background light, wherein the one or more first-length pulses and the one or more second-length pulses are detected in the ambient background light.

20. The system of claim 16, wherein the first-length pulses include a first sub-pulse-length range that is a portion of the first pulse-length range, wherein the second-length pulses include a second sub-pulse-length range that is a portion of the second pulse-length range, wherein the first-length pulses are longer than the second-length pulses, and wherein the first threshold is lower than the second threshold.

* * * * *